United States Patent
Roush et al.

(10) Patent No.: US 7,593,064 B2
(45) Date of Patent: Sep. 22, 2009

(54) SYSTEM FOR ADAPTIVE DISPLAY OF VIDEO IMAGE SEGMENTS

(75) Inventors: Stephen M. Roush, Ann Arbor, MI (US); Adam Marks, Leslie, MI (US); William Jin, Troy, MI (US); Chris O'Donnell, Ann Arbor, MI (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 738 days.

(21) Appl. No.: 11/383,547

(22) Filed: May 16, 2006

(65) Prior Publication Data

US 2007/0024752 A1    Feb. 1, 2007

Related U.S. Application Data

(60) Provisional application No. 60/702,414, filed on Jul. 26, 2005.

(51) Int. Cl.
*H04N 5/445* (2006.01)
*G06F 3/00* (2006.01)
*G06F 3/048* (2006.01)

(52) U.S. Cl. .................. 348/564; 715/719; 715/788; 715/789; 715/792

(58) Field of Classification Search ......... 348/553–570, 348/588; 715/716–726, 738, 781, 783, 788, 715/789, 792, 794, 838, 866
See application file for complete search history.

(56) References Cited

U.S. PATENT DOCUMENTS

| 6,384,846 | B1 |   | 5/2002  | Hiroi |         |
|-----------|----|---|---------|-------|---------|
| 7,020,381 | B1 | * | 3/2006  | Kato et al. | 386/52 |
| 7,231,603 | B2 | * | 6/2007  | Matsumoto | 715/716 |
| 7,444,593 | B1 | * | 10/2008 | Reid | 715/723 |
| 7,480,864 | B2 | * | 1/2009  | Brook et al. | 715/720 |
| 2003/0067479 | A1 | * | 4/2003 | Jung et al. | 345/721 |
| 2005/0210388 | A1 | * | 9/2005 | Matsumoto | 715/719 |
| 2008/0222527 | A1 | * | 9/2008 | Kang et al. | 715/723 |

\* cited by examiner

*Primary Examiner*—M. Lee
(74) *Attorney, Agent, or Firm*—Alexander J. Burke

(57) ABSTRACT

A system determines available system resources along with the complexity of video clips in order to initiate and adapt automatic video clip playback. A method automatically concurrently plays multiple video clips in at least one composite video image by automatically determining available processing resources based on a number of available processors and associated corresponding individual processor operational speed. The method involves automatically determining a number of video clips that may be concurrently played and displayed in a composite video image by the determined available processing resources based on a number of the multiple video clips and associated corresponding individual video clip compression type. The method also includes initiating concurrent play and display of the determined number of video clips in the composite video image.

17 Claims, 7 Drawing Sheets

SYSTEM FOR ADAPTIVE DISPLAY OF VIDEO IMAGE SEGMENTS

This is a non-provisional application of provisional application Ser. No. 60/702,414 by S. M. Roush et al. filed Jul. 26, 2005.

FIELD OF THE INVENTION

This invention concerns an adaptive system supporting automatic concurrent play and display of multiple video clips in at least one composite video image based on available resources.

BACKGROUND OF THE INVENTION

It is desirable to automatically play video clips such as medical image sequence clips accessed by a workstation, for example, if workstation hardware is able to support such automatic play and display. In existing systems automatic video clip playback is typically implemented by software or hardware functions. A software video clip playback function typically provides a user with limited playback capabilities. Existing software video clip playback functions automatically play one video clip at a time and do not efficiently use available system resources. Such existing software functions may not be able to maintain a video play frame rate during playback or may omit frames resulting in erratic or discontinuous playback.

A hardware video clip playback function typically employs specialized video hardware to provide a user with improved video playback performance compared to a software video playback function. However, hardware playback functions may require additional image storage and processing memory or may be constrained by limited available memory for use with the video playback hardware. A problems.

SUMMARY OF THE INVENTION

A system determines available system resources along with the complexity of video clips in order to initiate and adapt automatic video clip playback. An adaptive system supports automatic concurrent play and display of multiple video clips in at least one composite video image. The system includes a first operational unit for determining processing resources available to concurrently display multiple video clips in a composite video image based on a number of available processors and associated corresponding individual processor operational speed. A second operational unit determines processing resources needed to concurrently display the multiple video clips in a composite video image based on a number of the multiple video clips and associated corresponding individual video clip compression type. A comparator compares the determined available resources with needed resources to determine whether the available processing resources are able to support concurrent play and display of the multiple video clips in the composite video image. A video processor initiates concurrent play and display of the multiple video clips in the composite video image in response to a positive determination by the comparator.

DETAILED DESCRIPTION OF THE INVENTION

Figure 1:
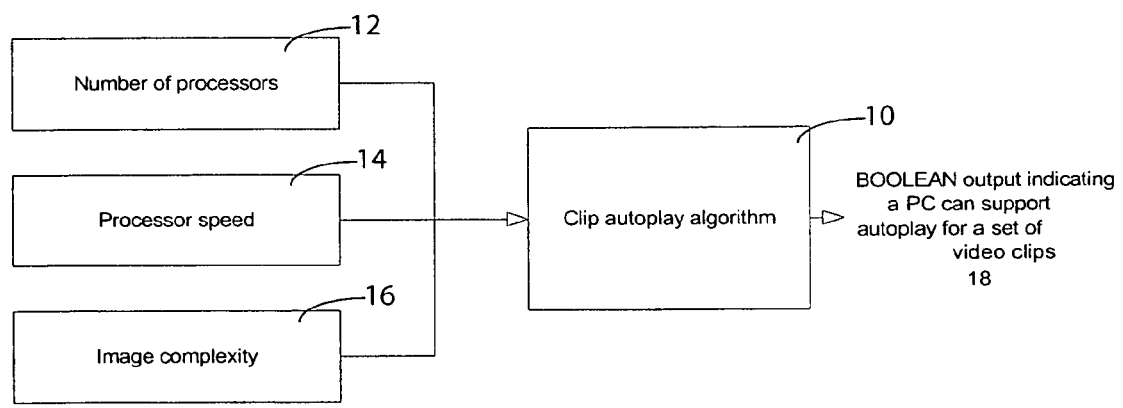
FIG. 1 shows an adaptive function supporting automatic concurrent play and display of multiple video clips in at least one composite video image, according to invention principles.

A system according to invention principles makes efficient use of workstation (e.g., PC) hardware by determining available system resources and the complexity of the video images and clips to display and playback. The system eliminates a need for specialized video hardware and reduces burden and costs of design, development and support of a medical image and video clip processing system. The system automatically determines if workstation hardware can automatically play video clips based on factors including, number of CPUs (central processing units) in the system, individual CPU processor speed and type of video clip to be processed, for example. The system automatically determines if a workstation is able to support real-time software decompression by determining a total CPU speed based on the number of CPUs multiplied by individual processor speed. For example, if a workstation contains four CPUs individually operating at 2.4 GHz to provide an effective total processing speed of 9.6 GHz. The total speed is compared with a minimum speed required to support real-time decompression of video clips. The type of video clip determines a minimum required CPU operating speed. A more complex video clip (e.g., a lossy JPEG compressed video clip) requires a higher minimum CPU operational processing speed than a relatively less complex video clip (e.g., a JPEG LOSSLESS compressed video clip).

The system automatically initiates video playback tailored to the hardware processing capabilities of the workstation employed and enables software to efficiently use processing hardware and take advantage of increasingly powerful processing capabilities. Existing workstation systems often employ software using relatively expensive specialized video hardware for video clip playback as otherwise the workstation provides limited video playback performance. The inventors have recognized that, as multiprocessor systems become more common, software may be provided to enable efficient use of additional CPU throughput to provide more advanced video playback and remove dependency on expensive proprietary hardware. The system according to invention principles may comprise image review software (or hardware or a combination of both) that makes efficient use of standard available workstation hardware in order to achieve automatic video playback and eliminate a need for expensive specialized video hardware.

An executable application as used herein comprises code or machine readable instruction for implementing predetermined functions including those of an operating system, healthcare information system or other information processing system, for example, in response user command or input. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor (an operational unit) as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A display processor or generator is a known element comprising electronic circuitry or software or a combination of both for generating display images or portions thereof. A user interface comprises one or more display images enabling user interaction with a processor or other device.

FIG. 1 shows an adaptive function 10 supporting automatic concurrent play and display of multiple video clips in at least one composite video image. In operation, a user of a dual-monitor image display system desires to concurrently view eight images, for example. A video clip autoplay function 10 (employing an algorithm, for example) determines that the workstation of the user is able to support automatic concurrent playback of eight video clips and automatically initiates concurrent playback of the eight video clips. The system advantageously enables the same software to be run on platforms employing different CPU performance without the need for configuration and determines if the host hardware is fast enough to support automatic, real-time video playback. The system including video playback function 10 determines whether host hardware is able to support automatic, real-time video playback of medical images encoded by various different compression functions. Playback function 10 employs information determining the number of processors 12 and individual processor speed 14 of the available playback hardware system and also determines image complexity 16 of the eight video clips to be played. Playback function 10 determines both CPU processing bandwidth of the available playback hardware system and the compression type of the eight video clips to be played. The processing bandwidth employed comprises the number of CPUs multiplied by individual CPU effective clock rate. It is common for operating systems used for image processing and other types of processing to have the ability to turn off extra CPUs in order to run as a single-processor system. Playback function 10 determines the available number of CPUs including CPUs available to be activated and provides a Boolean logic indicator output 18 indicating whether the workstation is able to support automatic play of the eight video clips. Function 10 also provides data indicating the number of video clips of determined complexity that may be automatically concurrently played by the workstation.

Figure 2:
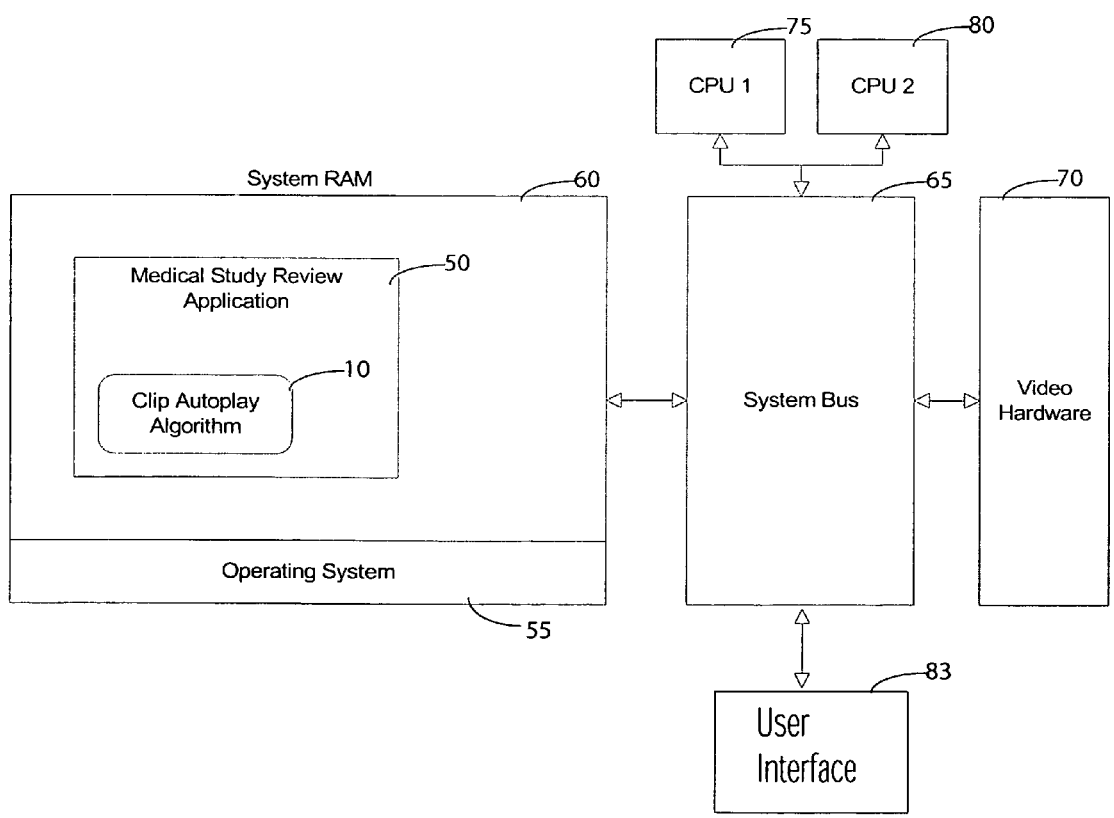
FIG. 2 shows an adaptive system supporting automatic concurrent play and display of multiple video clips in at least one composite video image, according to invention principles.

FIG. 2 shows an adaptive system 100 employed by a host workstation and server and supporting automatic concurrent play and display of multiple video clips in at least one composite video image. System 100, includes, for example, one or more processors (CPU1 75 and CPU2 80) and RAM (or other type of memory) 60 hosting operating system 55 and medical study reviewing application 50 including video clip playback function 10. System 100 includes a communication interface 65 incorporating a system bus (or other communication channel) supporting communication between the elements of system 100. CPUs 75 and 80 execute video clip playback function 10, operating system 55 and medical study reviewing application 50. Specifically, CPUs 75 and 80 execute video clip playback function 10 (an application or procedure) for determining configuration of a host workstation (or other target PC) to determine number of processors (here two—CPUs 75 and 80) and speed of processors 75 and 80 and also determines complexity (including compression type) of video clips to be played. The video clips are played on user interface 83 of a host workstation using video processing device 70 (e.g., PC video hardware compatible with PCI bus or a later PC bus or an application executing on CPUs 75 and 80). User interface 83 includes both a video and audio reproduction device such as a display together with a data and command entry device such as a keyboard, mouse or voice recognition system, for example.

Video clip playback function 10 also determines whether video hardware (e.g., PC video processing hardware within video device 70) is capable of independently supporting automatic concurrent play and display of the multiple video clips in at least one composite video image without use of software playback using CPUs 75 and 80. In response to a determination that video device 70 is able to independently support automatic concurrent play and display of the multiple video clips, playback function 10 initiates playback by device 70 without use of CPUs 75 and 80. Video playback function 10 employs functions within operating system 55 to determine if a workstation (local) system is able automatically play medical video clips, for example.

Figure 3:
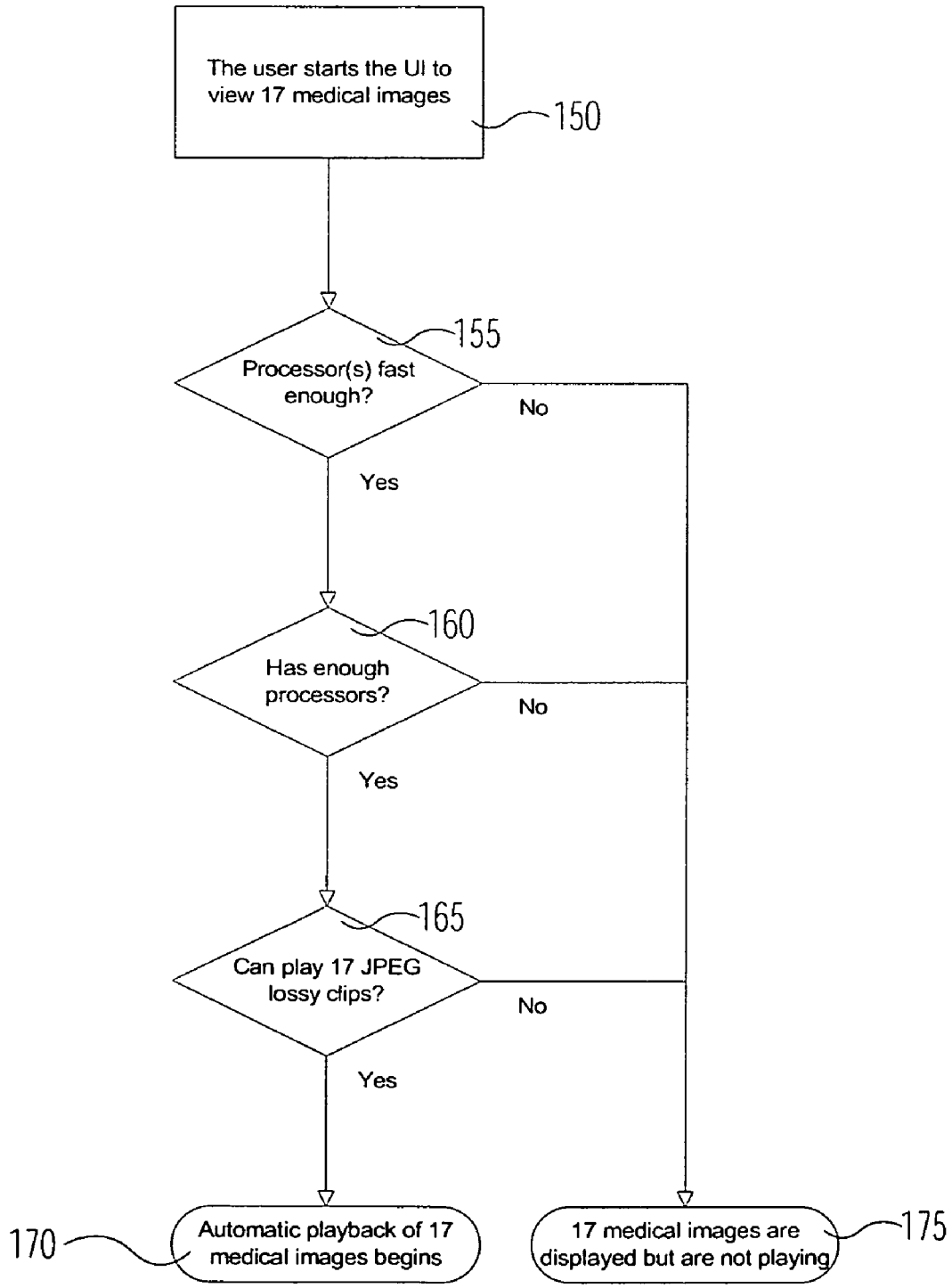
FIG. 3 shows a flowchart of a process employed by an adaptive video playback system, according to invention principles.

FIG. 3 shows a flowchart of a process employed by adaptive video playback function 10 operating in system 100 (FIG. 2). Video playback function 10 employs a method for automatically concurrently playing a plurality of video clips in at least one composite video image. Video playback function 10 automatically determines available processing resources based on a number of available processors and associated corresponding individual processor operational speed. Playback function 10 automatically determines a number of video clips that may be concurrently played and displayed in a composite video image by the determined available processing resources based on a number of video clips and associated corresponding individual video clip compression type. Playback function 10 initiates concurrent play and display of the determined number of video clips in the composite video image and determines the memory capacity available and the memory capacity necessary to concurrently display said video clips in said composite video image.

Video playback function 10 performs the process of FIG. 3 to determine both the CPU operation speed available in system 100 and the speed necessary to concurrently play selected video clips in a desired video format. The process also determines both available and necessary memory (e.g., RAM) and both available and necessary communication interface speed, to concurrently play selected video clips in a desired video format. In step 150, a user initiates concurrent display of seventeen medical image video clips via command via user interface 83 (FIG. 2). Video playback function 10 determines whether system 100 is able to support automatic concurrent playback of seventeen video clips in a desired format in a composite video image. In step 155, playback function 10 determines whether CPUs 75 and 80 are fast enough to support automatic concurrent playback of the seventeen video clips in a composite video image. In response to a determination that CPUs 75 and 80 are not fast enough, playback function 10 initiates display of the seventeen video clips as still images in a composite display image presented on user interface 83 in step 175.

In response to a determination that CPUs 75 and 80 are fast enough, playback function 10 determines in step 160 whether the two CPUs (CPUs 75 and 80) having the determined speed are sufficient to support automatic concurrent playback of the seventeen video clips in a composite video image. In response to a determination that the two CPUs (CPUs 75 and 80) are insufficient, playback function 10 initiates display of the seventeen video clips as still images in a composite display image presented on user interface 83 in step 175. In response to a determination that CPUs 75 and 80 are sufficient, playback function 10 determines in step 165, whether system 100 is able to support automatic concurrent playback of the seventeen video clips having a JPEG lossy type compression format in a composite video image. If system 100 is able to decode and concurrently play seventeen JPEG lossy type compression format video clips, playback function 10 initiates play and presentation of the video clips in a composite display image presented on user interface 83 in step 170. If system 100 is unable to decode and concurrently play seventeen JPEG lossy type compression format video clips, playback function 10 initiates display of the seventeen video clips as still images in a composite display image presented on user interface 83 in step 175.

In step 165, playback function 10 determines a complexity factor of individual images and a total image complexity factor comprising a sum of individual image complexity factors. For example, individual image complexity factor equals three for a JPEG lossy type of compressed image, equals two for any other image compression type having greater than eight bits per pixel and equals one for any other image compression type having eight hits per pixel. Playback function 10 determines a processor number representing a total image complexity that system 100 is able to support in automatic concurrent image playback. The processor number comprises a product of CPU processor speed multiplied by number of processors multiplied by a factor and if it exceeds the total image complexity factor, user interface 83 automatically concurrently displays the seventeen medical images. If the processor number is less than or equal to the total image complexity factor, user interface 83 automatically concurrently displays the seventeen medical images but as non-moving still images. For example, a Pentium 4 system having one CPU operating at 3.0 GHz is able to support a total image complexity of twenty (processor number equals twenty) (and supports concurrent play of six JPEG lossy video clips having total image complexity of 18). If a user initiates display of seventeen JPEG lossy video clips clips, these do not automatically concurrently play but are shown as still images. However, if system 100 comprises a dual-Xeon arrangement (4 CPUs operating at 2.4 GHz) with a total processor number of 60, for instance, if a user initiates display of seventeen JPEG lossy video clips having total image complexity of 51, these automatically concurrently play.

Video playback function 10 stores medical images in repository 60 in DICOM compatible format. In the header of a DICOM image file, a group/element (0002,0010), transfer syntax, denotes which compression type an image uses. In response to a command to initiate video clip play, video playback function 10 parses DICOM header information, including a succession of group/element tags, which includes the transfer syntax among many other things. Video clips are stored as individual static frames, individually compressed as specified by the associated transfer syntax. So a typical ultrasound clip may contain about two seconds of video information, for example. A video clip is stored as sixty separate static frames, individually compressed in lossy JPEG format, and each acquired at 33 msec intervals. Therefore playback of a video clip requires decompressing each frame for display for the correct time interval before switching to the next image. Regardless of the transfer syntax (identifying compression used), video clips are stored as a sequence of individual compressed frames.

Video playback function 10 automatically determines individual processor speed, as well as the number of processors, using a Windows XP API call, GetSystem.Info( ), for example. In response Windows indicates a Pentium 4 HT (Pentium 4 with HyperThreading) system in a dual-processor configuration, with each processor operating at 3.0 GHz. In another example, Windows considers a dual-Xeon HT machine as a 4-processor system, with each processor operating at 2.4 GHz. In one embodiment playback function 10 determines system 100 is able to automatically concurrently display seventeen video clips of a desired thirty two video clips and initiates automatic play of the seventeen video clips on a display monitor e.g., in user interface 83.

Figure 4:
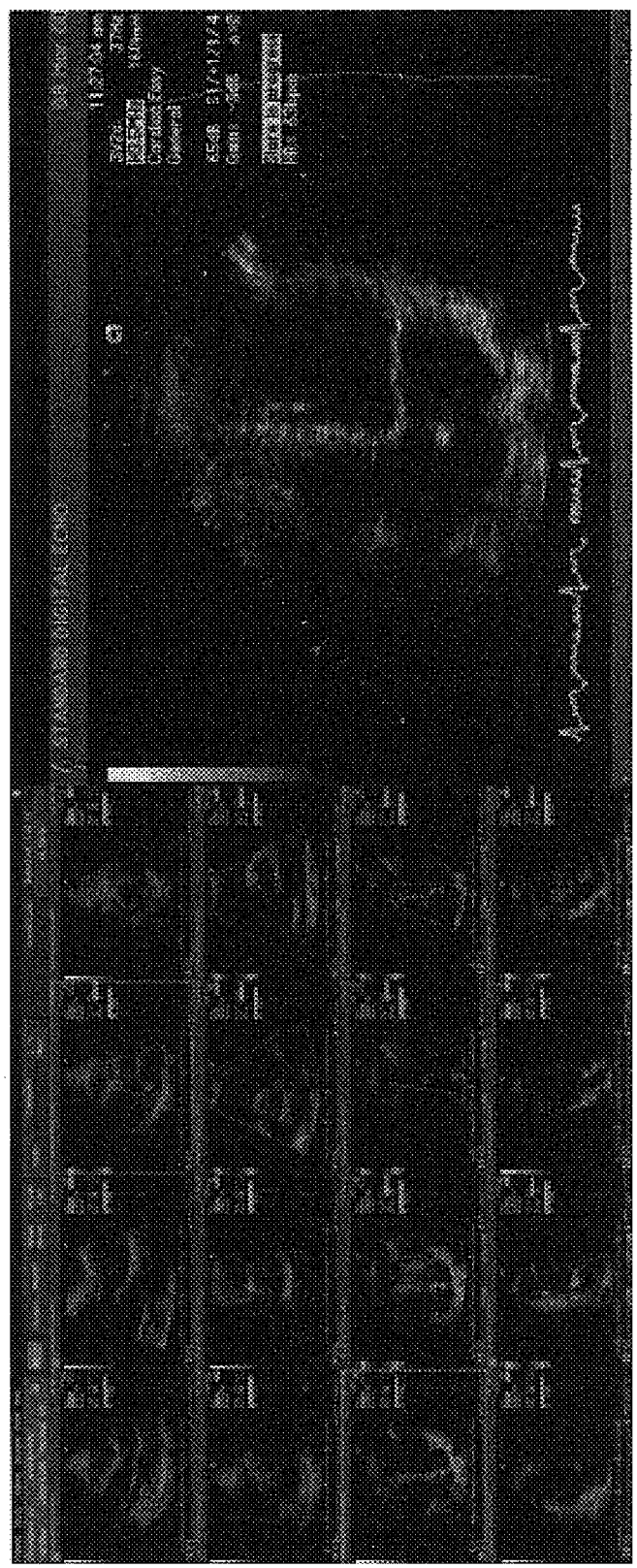
FIG. 4 shows a user interface image displaying multiple video clips in a composite video image provided by an adaptive video playback system, according to invention principles.

FIG. 4 shows a user interface image displaying seventeen video clips in a composite video image provided by adaptive video playback system 100. Video playback function 10 is executed upon a user command to initially display the seventeen video clips and determines that autoplay is supported for display of these seventeen clips. Specifically, in operation, a user initiates a command to display the seventeen medical images for a selected patient examination. Data representing the images is parsed and stored into various data structures in RAM 60 (FIG. 2) and video playback function 10 determines the compression type of each of the seventeen images. In system 100, user interface 83, comprising a dual monitor system with two display screens, is conditioned (with a "1:1 Max" image layout) to display images 2-17 on the left monitor screen and image 1 magnified on the right monitor screen. This image configuration is illustrated in FIG. 4. Video playback function 10 determines that system 100 is able to support automatic playback of seventeen JPEG lossy compressed type video (e.g., Ultrasound) clips and initiates creation by system 100 of seventeen display threads (concurrent processing operations) for each corresponding video clip of the seventeen clips. An individual display thread decompresses one video frame and initiates display of the decompressed frame on a screen of user interface 83 at the frame rate indicated in the DICOM file. Thereby system 100 provides motion video concurrent decoding and display for each of the seventeen video clips by using a single display thread for each video clip.

Patient imaging studies typically contain video clips that use the same type of video compression, but some studies contain video clips employing different types of video compression. Some ultrasound imaging studies contain video clips using JPEG lossy compression and some with palette color or RLE (Run Length Encoding) type video compression. Also, some catheterization imaging studies contain images with some clips using JPEG LOSSLESS compression and some with raw data storage, for example. Video playback function 10 identifies the different types of video compression from video header or other data or ancillary data associated with a video clip and uses this information in determining image complexity as previously described. Different compression types identified by playback function 10 include MPEG2, MPEG4, JPEG, TIFF, GIF, JPEG-LS (lossless and near-loss less), JPEG (lossy), Raw data, 8, 10, 12, 16-bit, Palette color reduction, RLE, for example. Automatic playback of video images typically does not include still images. Medical images are video clips having DICOM compatible group/element 0028,0008, number of frames or are still images without such a group/element.

Figure 5:
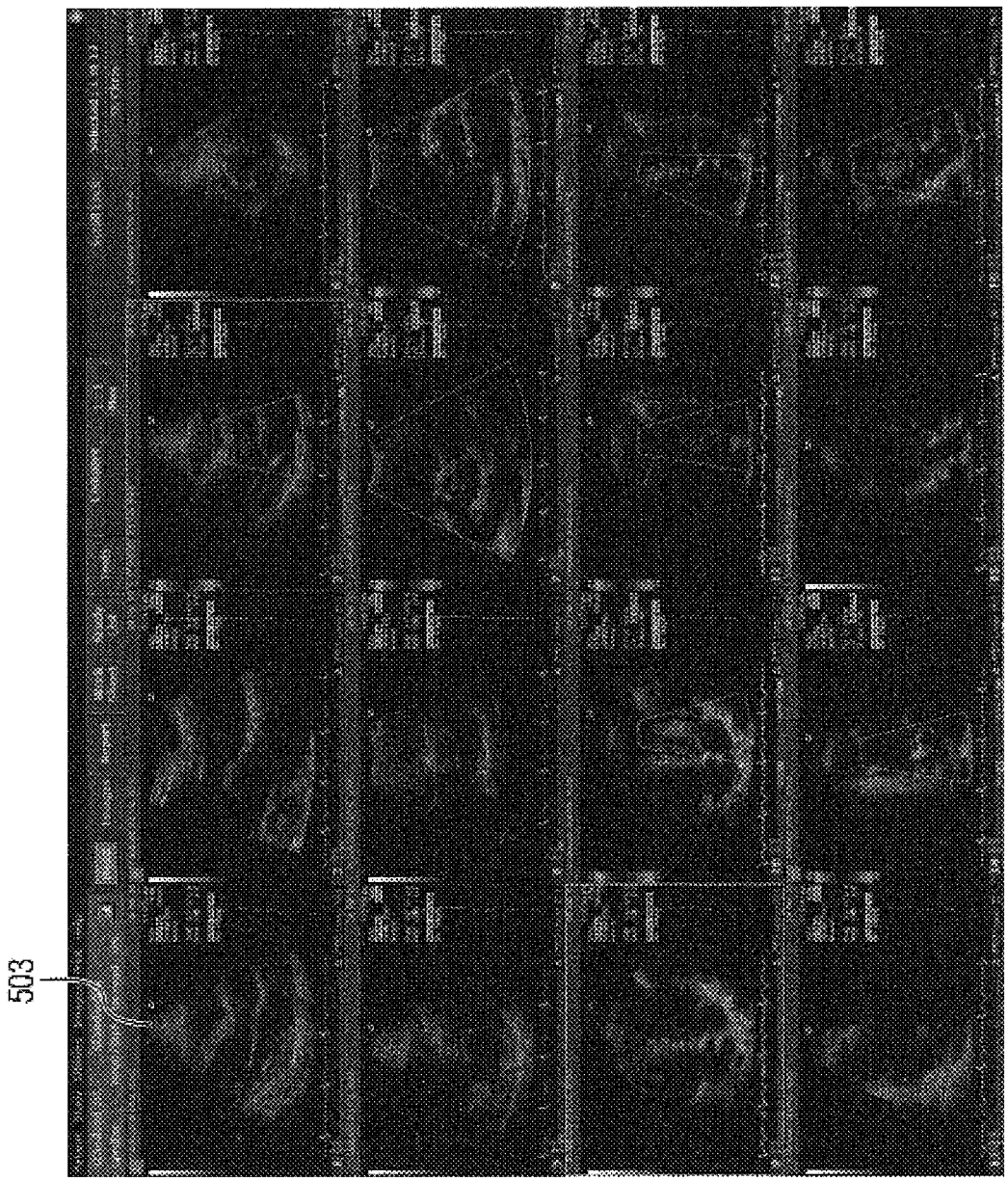
FIG. 5 shows a user interface image concurrently displaying sixteen video clips in a composite video image provided by an adaptive video playback system, according to invention principles.

FIG. 5 shows a user interface image concurrently displaying sixteen video clips in a composite video image on a left monitor of the user interface 83 dual monitor configuration provided by an adaptive video playback system in system 100. The image shows a snapshot of 16 medical video clips playing in a 4×4 grid layout. Each cell in the grid is a single medical image clip. For example, video clip 503 is acquired by an ultrasound machine with a transducer (in the same location on the patient) to create video clip 503 consisting of 57 still frames at a frame rate of 30 frames per second. Each 33 msecs, the cell showing video clip 503 displays a next static frame in the clip, thus creating a motion video image that repeats every 1.9 secs. Likewise, the other fifteen cells in FIG. 5 show different respective medical video clips, created from different image data acquisitions on the patient.

Figure 6:
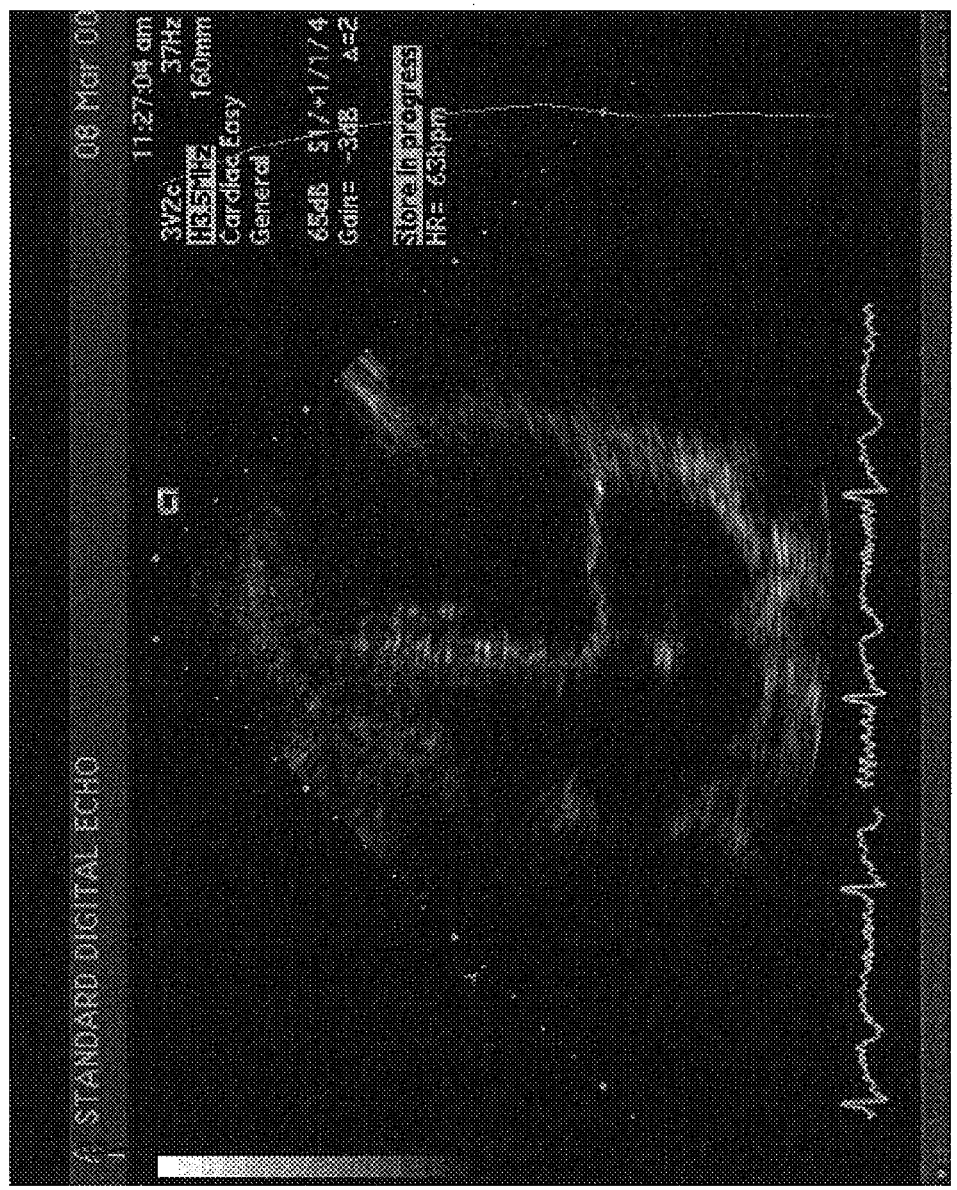
FIG. 6 shows a user interface image displaying a single video clip on a particular monitor, according to invention principles.

FIG. 6 shows a user interface image displaying a single video clip on the right monitor of the user interface 83 dual monitor configuration provided by an adaptive video playback system in system 100. Automatic playback of video images typically does not include still images. For medical images, they are either clips or static. Video clips have the group/element 0028,0008, number of frames, and still images do not have this group/element. Since a static image has one frame, there is no motion video for this type of image.

Figure 7:
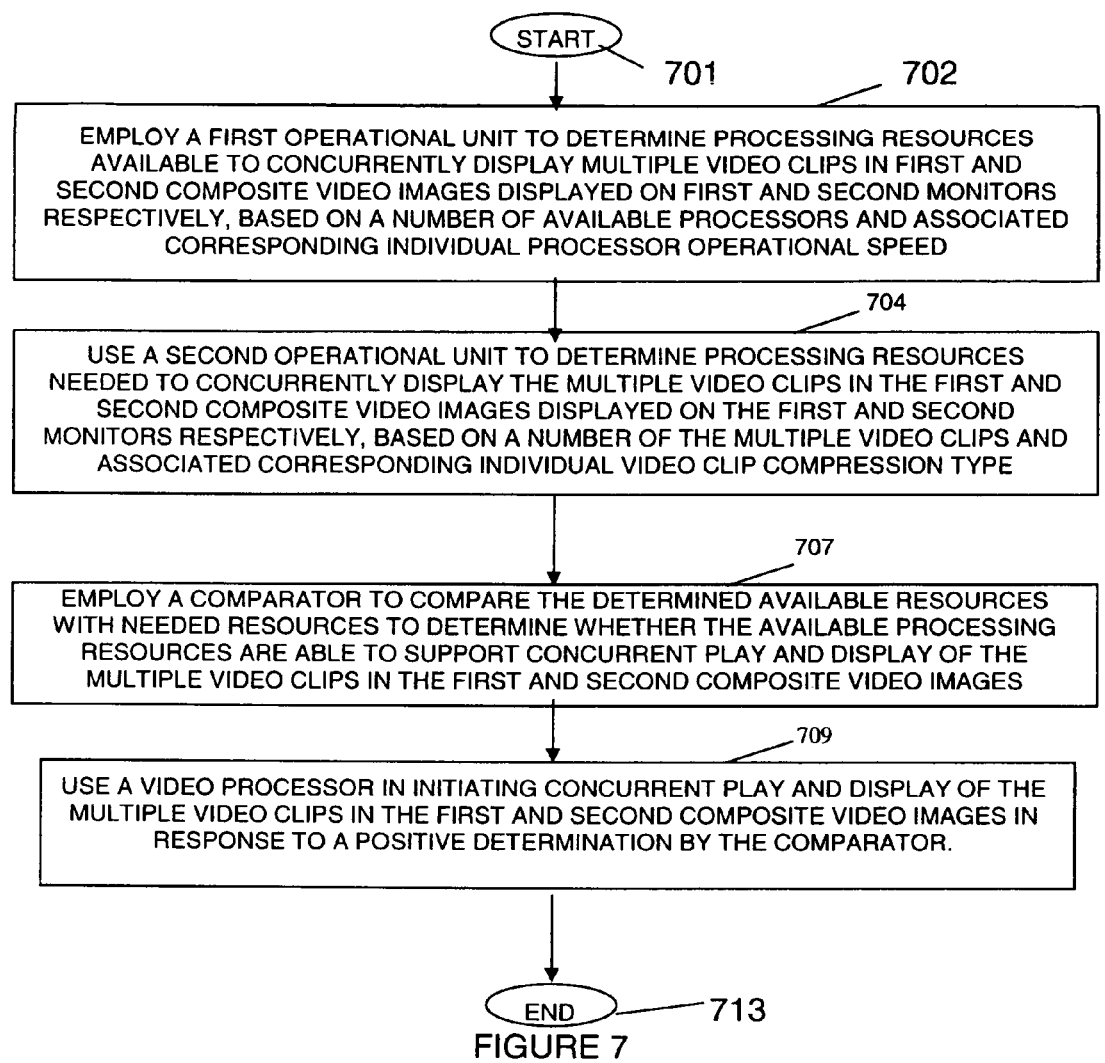
FIG. 7 shows a flowchart of a process employed in automatic concurrent play and display of a multiple video clips in at least one composite video image, according to invention principles.

FIG. 7 shows a flowchart of a process employed in automatic concurrent play and display of multiple video clips in at least one composite video image. In step 702 following the start at step 701, a first operational unit in video playback function 10 determines processing resources available to concurrently display multiple video clips in first and second composite video images displayed on first and second monitors respectively, based on a product of the number of available processors and associated corresponding individual processor operational speed (and a predetermined factor in one embodiment). The multiple video clips include video clips of different compression type. The first operational unit determines processing resources available by automatically determining the number of the multiple video clips that may be concurrently played and displayed. The determined available processing resources comprise memory capacity (e.g., RAM) available to concurrently display multiple video clips in the first and second composite video images.

A second operational unit in video playback function 10 in step 704 determines processing resources needed to concurrently display the multiple video clips in the first and second composite video images displayed on the first and second monitors respectively. The second operational unit does this based on a number of the multiple video clips and associated corresponding individual video clip compression type as well as based on a number of bits per pixel employed. The second operational unit determines processing resources comprising memory capacity needed to concurrently display multiple video clips in the first and second composite video images. The second operational unit determines a complexity representative factor comprising a number associated with video clip compression type. The complexity representative factor indicates processing resources needed to concurrently display the multiple video clips by summing individual complexity factors of individual video clips. In step 707, a comparator in video playback function 10 automatically compares the determined available resources with determined needed resources to determine whether the available processing resources are able to support concurrent play and display of the multiple video clips in the first and second composite video images. The comparator automatically determines the number of the multiple video clips that may be concurrently played and displayed by the available processing resources A video processor in video playback function 10 in step 709 automatically initiates concurrent play and display of the determined number of multiple video clips in the first and second video images in response to a positive determination by the comparator and to the number determination by said first operational unit. The process of FIG. 7 ends at step 713.

The systems and processes presented in FIGS. 1-7 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system according to invention principles is usable wherever multiple concurrent video clips need to be played by a processing device. Further, any of the functions provided by the systems and processes of FIGS. 1-7 may be implemented in hardware, software or a combination of both and may reside on one or more processing devices located at any location of a network linking the FIG. 2 elements.

What is claimed is:

1. A method for automatically concurrently playing a plurality of video clips in at least one composite video image, comprising:
    automatically determining available processing resources based on a number of available processors and associated corresponding individual processor operational speed;
    automatically determining a number of video clips that may be concurrently played and displayed in a composite video image by said determined available processing resources based on a number of said video clips and associated corresponding individual video clip compression type; and
    initiating concurrent play and display of said determined number of video clips in said composite video image.

2. A method according to claim 1, including the activity of determining memory capacity available to concurrently display said video clips in said composite video image.

3. A method according to claim 2, including the activity of determining memory capacity needed to concurrently display said video clips in said composite video image.

4. A method according to claim 1, including the activity of determining video clip compression type from header information of a DICOM image file associated with a video clip.

5. An adaptive system supporting automatic concurrent play and display of a plurality of video clips in at least one composite video image, comprising:
    a first operational unit for determining processing resources available to concurrently display a plurality of video clips in a composite video image based on a number of available processors and associated corresponding individual processor operational speed;
    a second operational unit for determining processing resources needed to concurrently display said plurality of video clips in a composite video image based on a number of said plurality of video clips and associated corresponding individual video clip compression type;

a comparator for comparing said determined available resources with determined needed resources to determine whether said available processing resources are able to support concurrent play and display of said plurality of video clips in said composite video image; and a video processor for initiating concurrent play and display of said plurality of video clips in said composite video image in response to a positive determination by said comparator.

6. A system according to claim 5, wherein
said comparator automatically determines the number of said plurality of video clips that may be concurrently played and displayed by said available processing resources and said video processor automatically initiates concurrent play and display of said determined number of said plurality of video clips in said composite video image in response to said number determination by said comparator.

7. A system according to claim 5, wherein
said first operational unit determines processing resources comprising memory capacity available to concurrently display a plurality of video clips in said composite video image, said second operational unit determines processing resources comprising memory capacity needed to concurrently display a plurality of video clips in said composite video image.

8. A system according to claim 7, wherein
said memory capacity comprises RAM capacity.

9. A system according to claim 5, wherein
said second operational unit determines processing resources needed to concurrently display said plurality of video clips in a composite video image based on a number of bits per pixel employed.

10. A system according to claim 5, wherein
a complexity factor comprises a number associated with video clip compression type and said second operational unit determines a complexity representative factor indicating processing resources needed to concurrently display said plurality of video clips by summing individual complexity factors of individual video clips.

11. A system according to claim 5, wherein
said plurality of video clips include video clips of different compression type.

12. A system according to claim 5, wherein
said first operational unit determines processing resources available to concurrently display a plurality of video clips in a composite video image by determining a number representative of available resources based on a product of the number of available processors and associated corresponding individual processor operational speed.

13. A system according to claim 12, wherein
said number representative of available resources comprises a product of the number of available processors and associated corresponding individual processor operational speed and a predetermined factor.

14. A system according to claim 5, including
first and second display monitors,
said first operational unit determines processing resources available to concurrently display said plurality of video clips in first and second video images displayed on said first and second monitors respectively and said second operational unit determines processing resources needed to concurrently display said plurality of video clips in said first and second video images displayed on said first and second monitors respectively.

15. An adaptive system supporting automatic concurrent play and display of a plurality of video clips on a plurality of monitors, comprising:

first and second display monitors;

a first operational unit for determining processing resources available to concurrently display a plurality of video clips in first and second video images displayed on said first and second monitors respectively, based on a number of available processors and associated corresponding individual processor operational speed;

a second operational unit for determining processing resources needed to concurrently display said plurality of video clips in said first and second video images displayed on said first and second monitors respectively, based on a number of said plurality of video clips and associated corresponding individual video clip compression type;

a comparator for comparing said determined available resources with determined needed resources to determine whether said available processing resources are able to support concurrent play and display of said plurality of video clips in said first and second video images; and a video processor for initiating concurrent play and display of said plurality of video clips in said first and second video images in response to a positive determination by said comparator.

16. A system according to claim 15, wherein
said first operational unit determines processing resources available by automatically determining the number of said plurality of video clips that may be concurrently played and displayed and said video processor automatically initiates concurrent play and display of said determined number of said plurality of video clips in said first and second video images in response to said number determination by said first operational unit.

17. A system according to claim 15, wherein
said first operational unit determines processing resources comprising memory capacity available to concurrently display a plurality of video clips in said first and second video images, said second operational unit determines processing resources comprising memory capacity needed to concurrently display a plurality of video clips in said first and second video images.

* * * * *